March 10, 1931. Z. AUERBACH 1,795,698
FILING AND RECORDING SYSTEM
Filed Dec. 29, 1926 3 Sheets-Sheet 1

INVENTOR
Z. Auerbach
BY
ATTORNEY

March 10, 1931.  Z. AUERBACH  1,795,698
FILING AND RECORDING SYSTEM
Filed Dec. 29, 1926  3 Sheets-Sheet 2
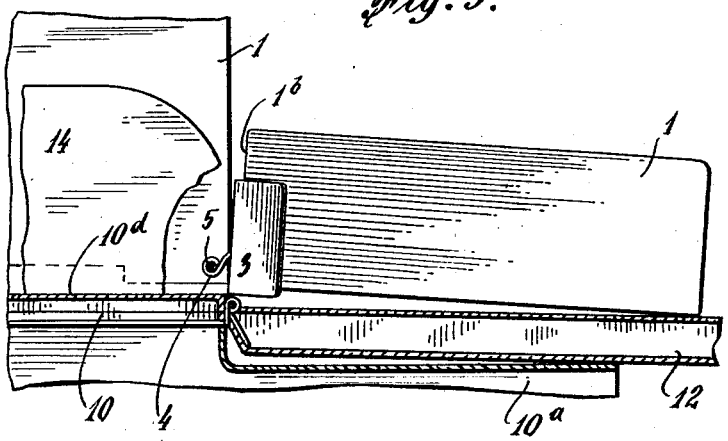
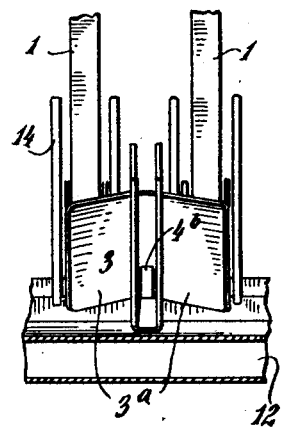
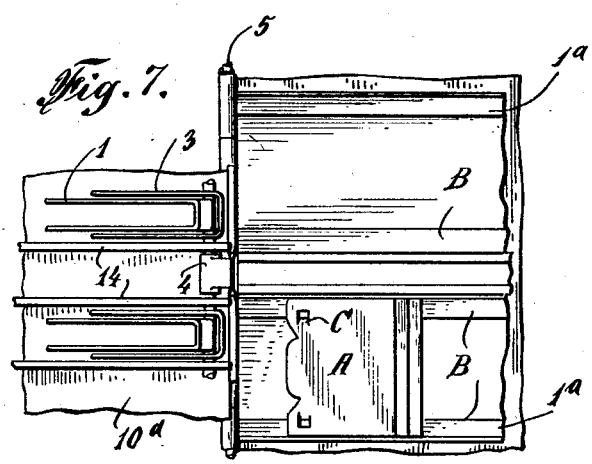
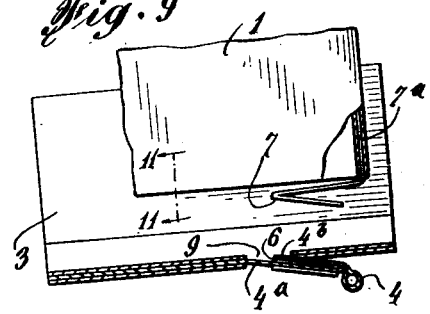
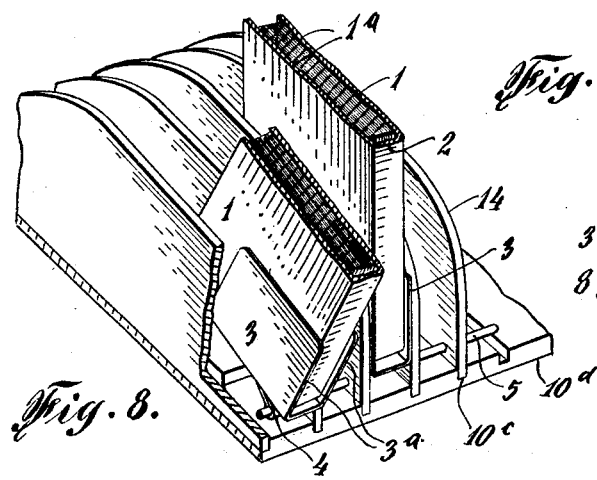
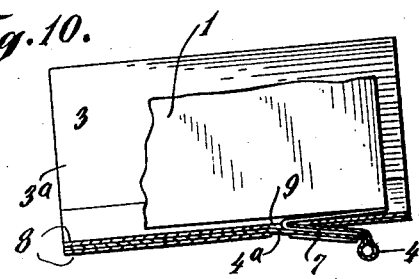
INVENTOR
Z. Auerbach
BY
ATTORNEY March 10, 1931.   Z. AUERBACH   1,795,698
FILING AND RECORDING SYSTEM
Filed Dec. 29, 1926   3 Sheets-Sheet 3
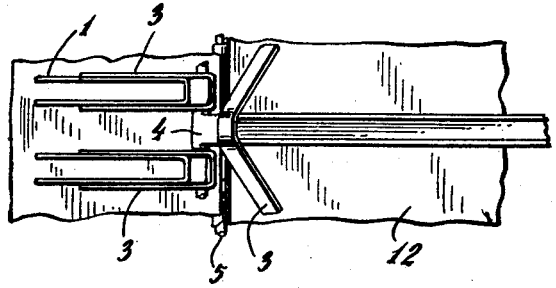
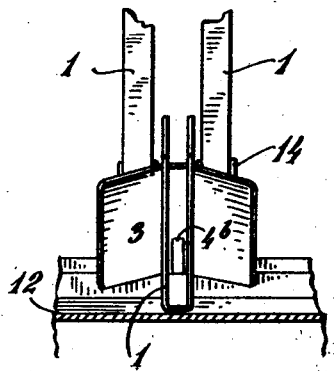
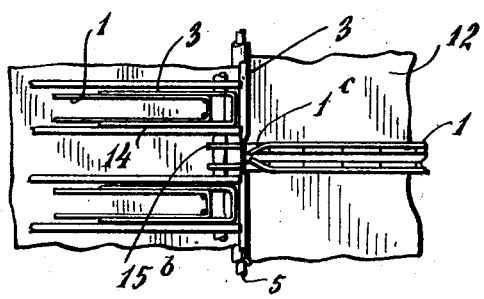
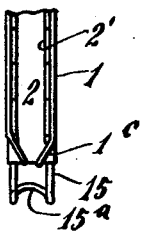
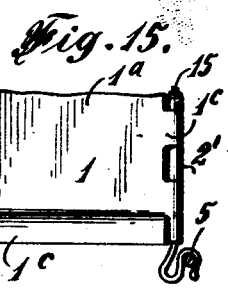
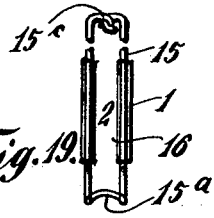
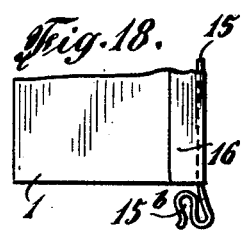
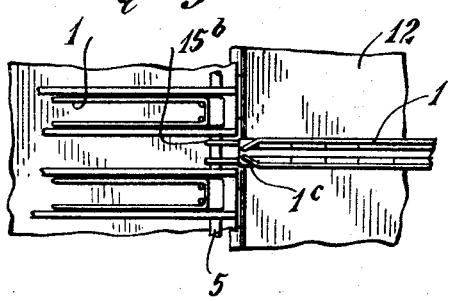
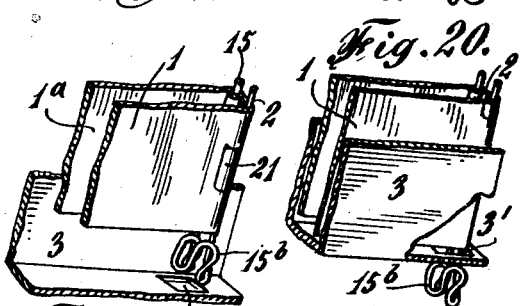
INVENTOR
Z. Auerbach
ATTORNEY Patented Mar. 10, 1931

1,795,698

UNITED STATES PATENT OFFICE

ZEMACH AUERBACH, OF NEW YORK, N. Y.

FILING AND RECORDING SYSTEM

Application filed December 29, 1926. Serial No. 157,649.

The object of my invention is to movably retain binders, book covers, books, filing racks, and the like in such a way that they may be set on edge side by side when out of use and may be swung down and rested upon a support in position to be opened for reference and use, so that such binders and the like may be kept in a desired order for access.

My invention comprises novel details of improvement that will be more fully hereinafter set forth and then pointed out in the claims.

Reference is to be had to the accompanying drawings forming a part hereof, wherein Fig. 1 is a face view illustrating my improvements in connection with a cabinet;

Fig. 5 is a detail section illustrating a binder in a position to be opened;

Fig. 6 is an edge view of Fig. 5;

Fig. 7 is a detail plan view illustrating one of the binders open for reference and provided with detachable cards;

Fig. 8 is a perspective detail;

Fig. 9 is a longitudinal section through one of the flap members, showing a binder attached;

Fig. 10 is a corresponding view showing the parts assembled;

Fig. 11 is a cross section through a binder substantially on line 11, 11, in Fig. 9;

Fig. 12 is a detail plan view illustrating the device without partitions between the binders;

Fig. 13 is an edge view of Fig. 12;

Fig. 14 is a detail plan view illustrating a modified form of binder with a flap member;

Fig. 15 is a detail of a portion of the binder of Fig. 14;

Fig. 16 is an edge view of Fig. 15;

Fig. 17 is a view similar to Fig. 14, without the flap member;

Fig. 18 is a detail of a modified form of binder;

Fig. 19 is an edge view of Fig. 18;

Fig. 20 is a detail view illustrating a modified form of flap member, and

Fig. 21 illustrates the parts of Fig. 20 detached.

Similar numerals of reference indicate corresponding parts in the several views.

Figure 1:
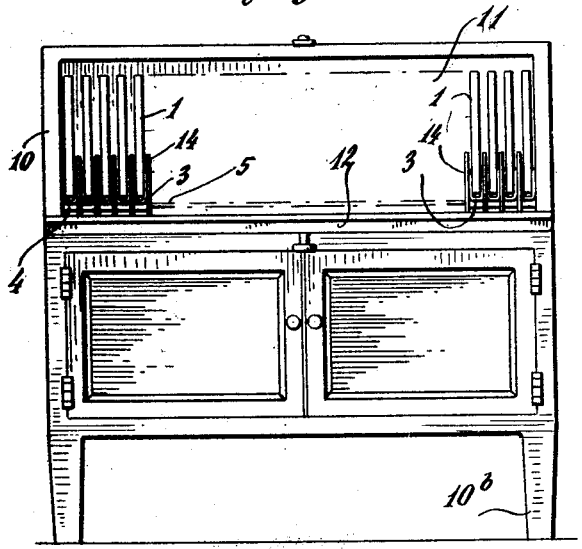
Figure 2:
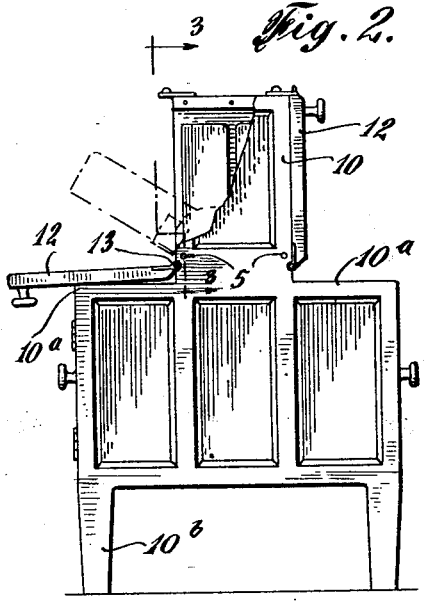
Fig. 2 is a partly broken side view of Fig. 1.
Figure 3:
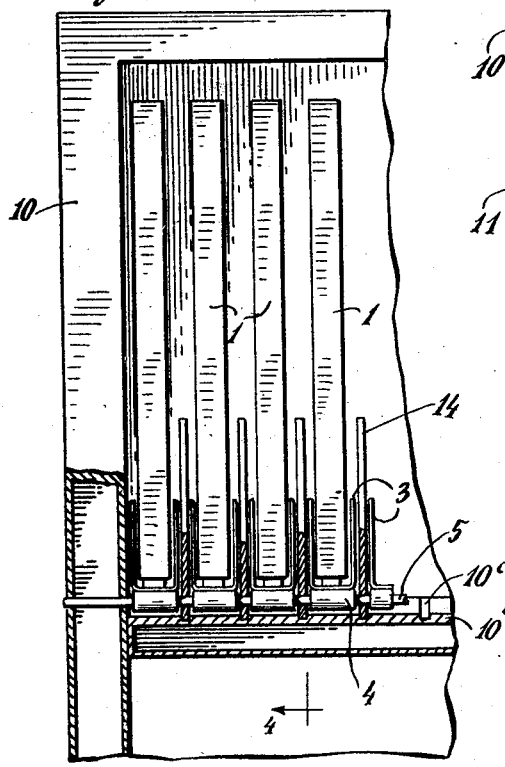
Fig. 3 is an enlarged detail, partly in section, on line 3, 3, in Fig. 2.
Figure 4:
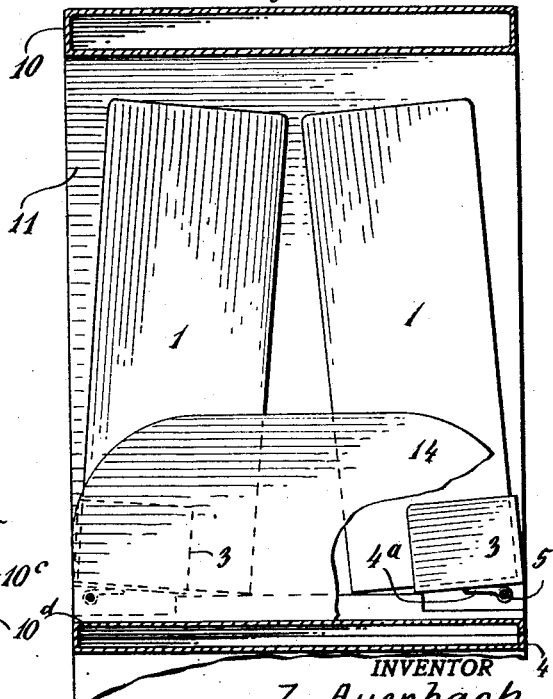
Fig. 4 is a section substantially on line 4, 4, in Fig. 3.

At 1 is indicated binders, book covers, filing racks, or the like, which are provided with means at a corner to pivotally support them to be stood on edge and to be pulled down to be opened for reference and use. The binders comprise covers 1a, shown hinged together along adjacent edges, as with a back, so as to be opened and closed in the nature of binders or book covers. The hinge means or back may be of any suitable character. In Figs. 1 to 11 I have shown adjacent edges of the covers 1a secured together by strips of fabric 2 which may be glued or otherwise secured to the covers, to form the hinge or back. The binders are provided with means to pivotally support them adjacent to a corner at the bottom portion, whereby the binders may be stood on edge, as indicated in Figs. 1, 2 and 3, and may be tilted to rest on their backs to be opened for inspection and use, as indicated in Figs. 5, 6 and 7. In some forms of my invention I provide flap members 3 within which a corresponding binder is adapted to fit and to which members such binders are attached in such a manner that when a binder is tilted forwardly for use its flap member will be tilted with it, (Fig. 5), and will spread out so that the binder covers may be laid flatwise for reference or use, (Fig. 7), and whereby when the binder is tilted reversely for storage the flap member will engage either adjacent partitions or adjacent binders to fold therebetween and thereby be folded outside of the end portion of the binder to guide the end or lower edges of the binder into position between the partitions or adjacent binders. In the example illustrated in Figs. 1 to 10 each flap member 3 is provided with a bearing shown in the form of an eye at 4 journaled upon a rod 5 supported by a rack or cabinet, so that the several binders may stand on edge in spaced relation side by side. The bearing 4 shown in said figures comprises a strip 4a coiled upon itself to form the bearing or eye 4 and extending reversely at 4b providing a space at 6 between the adjacent portions of the strip to serve as a keeper to detachably receive a hook-like member 7 on the binder, (Figs. 9 and 10). The flap member 3 comprises webs or sheets 3a which may be of cardboard, metal or the like, connected together by a suitable hinge member behind the binder, which member may comprise strips of fabric 8 glued to the webs with an extending portion of the strip 4a located therebetween. The keeper space 6 is exposed through an opening 9 in the hinge portion of the flap member 3 to admit the hook-like member 7, (Figs. 9 and 10). The hook-like member 7 comprises a strip of metal 7a that is secured to the hinge member or back of the binder, being shown located between the strips 2 with the member 7 projecting from the lower corner of the binder when the latter is standing on edge. The arrangement is such that the flap members 3 may remain hinged on rod 5 and the binders may be detachably connected with the flap members by the detachable engagement of the hooks 7 with the keepers 6.

The binders and their flap members are maintained in spaced relation in a suitable support, such as a rack or cabinet of any desired construction, which supports the rod 5. I have illustrated a rack or cabinet 10 in which the rod 5 is supported as at its ends, the rack or cabinet being provided with opening 11 in its side through which the binders may be passed. To keep the binders enclosed a door 12 may be hinged as at 13 to the rack or cabinet to close in front of the opening 11, (Fig. 2). The door, when open, may rest upon a shelf-like portion 10a of the cabinet, in which position of the door the binders may be swung down to rest thereon for inspection and use. The rack or cabinet may be made of metal or wood in any desired way. The door 12 may be dispensed with and the support or shelf 10a may itself serve to support the binders when they are pulled down for use. The rack or cabinet may be in a unitary structure comprising supporting legs 10b, as illustrated, or the rack or cabinet may be an independent structure without legs to be set upon a desk or table. The rack may be adapted to retain two series of binders on opposite sides thereof with the appropriate side openings 11 with or without doors 12, (Fig. 2), or the rack may be provided with a single row of binders and a single side opening therefor. It will be noted that the rod 5 is supported in such a position, near the lower part of side opening 11 of the rack, that the binders at their lower corners will be hinged to swing in and out of the rack in the manner described and will stand on their lower edges when within the rack. Partitions 14 may be provided within the rack in spaced relation to receive the flap members 3 and the corresponding binders therebetween, (Figs. 1, 3 and 8). The partitions 14 may be secured within the rack in any desired way, such as by grooves 10c in the base or bottom wall 10d of the rack, (Fig. 8), or by soldering the partitions to such base when the rack is made of metal.

When a binder is in position of non-use or storage, standing on edge, its flap member 3 will be folded against the outer sides of the binder and between the adjacent partitions, (Figs. 1 and 3). When the binder is swung down for use it will draw the flap member with it and when the latter has been pulled out from between the adjacent binders and partitions said flap member will spread behind the binder (Fig. 6), and the binder covers 1a may be spread open before the user for reference and the like, (Fig. 7). When the binder is to be restored to the rack its covers will be folded together and as the binder is swung upwardly on its hinge toward the rack the flap member will be pushed back by the binder and the webs of the member will engage the adjacent partitions and thereby will be caused to fold against the binder to cause its covers to be guided in a closed condition between the partitions. The flap member thereby keeps the binder covers from being injured when being restored to position in the rack, (Fig. 8). If the partitions are not used a flap member will fold against adjacent flap members when the binders are being restored to the rack, (Figs. 12 and 13).

The inner edges 1b of the binder covers 1a, on which they stand, may be straight, as in Figs. 1 to 13, or such inner edges may be extended inwardly at 1c as an aid in guiding the covers into position between the partitions or the adjacent binders, (Figs. 14–17). In such form the binders may be used with the flap members 3, (Fig. 14), or without the flap members, (Fig. 17). When the binder covers have the inwardly extending edges 1c the covers may be made of metal. In such case the backs 1″ of the binders may comprise metal strips having hinge eyes 2′ receiving hinge rods 15, and the covers 1a have hinge eyes 1e receiving said rods, (Figs. 16 and 17), for pivotally connecting the covers with the back. The hinge rods 15 may be in a single piece of wire having an intermediate transverse member 15a between them and the adjacent portion of the wire bent to form hook-like eye at 15b adapted to detachably receive the rod 5, whereby the binder may be readily applied to or removed from the rod on which it hinges, (Fig. 15–16).

If the binder covers are made of pasteboard or the like the hinges may be formed by strips of fabric 16 glued to the edges of the covers and enclosing the rods 15, the outer ends of the rods being looped or otherwise secured together at 15c, (Fig. 19).

Instead of forming the hinge backs 1'' of the flap members 3 with the eyes 4 to receive hooks 7 the backs of the flaps may be provided with holes 3' through which the hinge hooks 15b may be passed for engagement with the rod 5 and to retain the flap members between said rod and the adjacent edges of the binder covers, whereby the flap members will operate in the manner before described, (Figs. 20, 21).

The covers of the binders may be provided with means to retain cards, indicated at A, in the nature of a filing system, (Fig. 7), the inner surfaces of the covers being provided with guides B for the cards, which cards may have any suitable means for detachably connecting them with the guides, such as projections at C, (Fig. 7). Or the binder covers may be provided with means for detachably connecting leaves or sheets therewith, such as in the nature of loose leaf binders, or the binders may be in the form of bound books, whereby records may be kept in any desired way.

An advantage of my invention is that the binders may be retained in the rack in side by side relation, standing on edge, so as to be in compact form to reduce space required and in a convenient position for reference and use, since a large number of cards or leaves may be located within each of the binders. A binder may be readily pulled down for use and then may be returned to its normal position by merely swinging the same upon its hinge, and the binders will be pivotally maintained in proper relative positions for reference.

I use the term "binder" in a broad sense as including one or more covers, united along the back or singly, as in the nature of book covers or books, whether the recording portions be in the form of cards, loose leaves or bound. Instead of using two covers for a binder one of the covers may be omitted and the binders be pivotally supported as set forth.

My invention is not limited to the details of construction and arrangement of parts set forth, as the same may be varied, within the scope of the appended claims, without departing from the spirit of my invention.

Having now described my invention what I claim is:—

1. A device of the character described comprising a binder, means attached to a corner of the binder to pivotally support the binder adjacent to said corner near its back for retaining the binder on edge and permitting it to be swung down for reference, and a flap member adjacent to the pivotal corner of the binder having webs located outside of the binder and adjacent to its end edges, said webs being hinged along said edges and adapted to fold against end portions of the binder between adjacent binders and to spread behind the binder when the latter is swung down.

2. A device as set forth in claim 1, provided with means to detachably connect the binder with its flap member.

3. A device as set forth in claim 1, in which the binder is provided with a hook-like member and the flap member is provided with a keeper for detachably retaining the hook-like member.

4. A device of the character described comprising a rack having an open side, a door hinged at the lower part of the rack to swing outwardly therefrom, and binders having flap members at their corners pivotally connecting the binders to the rack adjacent to their backs to be located in side by side relation standing on edge and to be swung outwardly for support upon the door for reference while pivotally attached to the rack.

5. A device of the character described comprising a rack, a series of binders located in spaced relation side by side, and means attached to and pivotally supporting the binders adjacent to corners of their backs upon the rack to permit the binders to be swung into spaced relation on edge and to be swung outwardly from the rack to be opened for reference while attached to said means, the binders being provided with flap members pivotally supported and having hinged members behind the binders, the hinge members having webs located outside of the binder and hingedly connected along and adjacent to its end edges, said members being movable by and with the binders, said webs being adapted to fold against end portions of the binder between adjacent binders and to spread behind the binder when the latter extends outwardly from the rack to be pushed back by the binder.

6. A device as set forth in claim 4, in which the pivotally supported flap members have webs pivotally supported behind the binders and located outside of the binder covers hingedly connected along and adjacent to the end edges of the latter.

7. A binder comprising covers hinged to a back and provided with a hook-like member adjacent to a corner of the back, and a flap member comprising webs and a hinge member, said member being provided with a keeper for the hook-like member, webs of the flap member being located outside of the binder when the latter is between spaced binders.

8. A device of the character described comprising a binder having covers and a back hinged thereto, a strip attached to the back and provided with a hook-like member extending from a corner of the back, and a flap member comprising side webs and hinge strips secured thereto with a strip attached to the hinge strips and provided with an eye to receive a supporting rod and having a keeper to receive the hook-like member of the binder with the webs of the flap member located at the outer sides of the binder and lying thereagainst when the binder is between spaced binders.

ZEMACH AUERBACH.